UNITED STATES PATENT OFFICE.

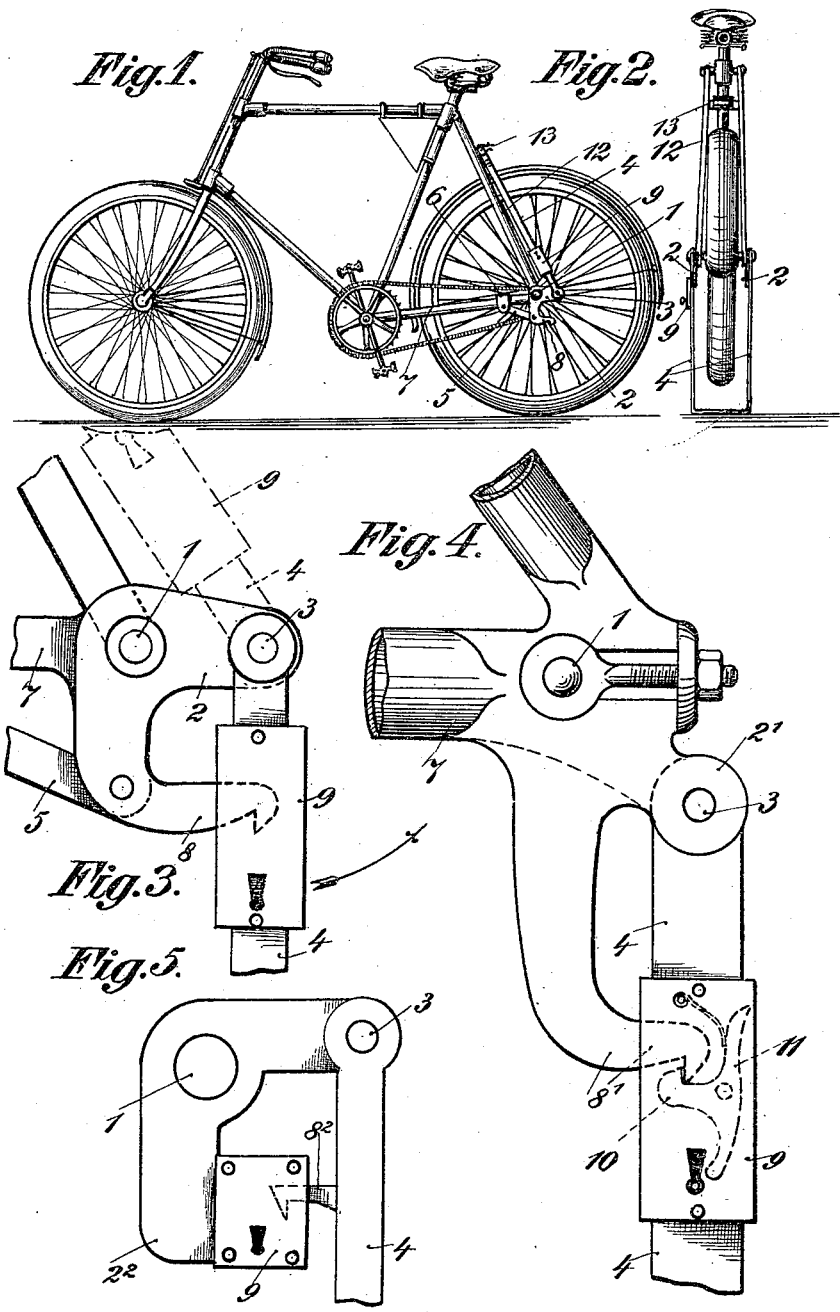

KARL DUVE AND FRANZ DUVE, OF HANOVER, GERMANY.

SUPPORT FOR BICYCLES AND THE LIKE.

947,379.  Specification of Letters Patent.  Patented Jan. 25, 1910.

Application filed August 3, 1908. Serial No. 446,811.

*To all whom it may concern:*

Be it known that we, KARL DUVE and FRANZ DUVE, subjects of the German Emperor, and residents of 3 Grosse Aegidienstrasse, Hanover, Germany, have invented certain new and useful Improvements in Supports for Bicycles and the Like, of which the following is a specification.

The present invention relates to a support for bicycles and the like by means of which both a misappropriation of the bicycle etc., when not in use, and besides the use of it by strangers are to be prevented at all.

The special feature of our invention lies in the combination of a double-sided stand of known construction with an automatically locking-contrivance owing to which the stand, when required for use, is immediately and automatically closely fixed in such a way, that it can no more be opened by strangers. In the present invention therefore, by turning down the stand, the bicycle is fixed in position with only one manipulation and besides it is secured in this way against theft and in general against any use by strangers. Not before releasing the locking device by means of a suitable key, the stand can be turned up and the bicycle be taken in use again.

The stand is preferably hinged at two projecting-pieces arranged at both sides of the hind-wheel of the bicycle and outstanding to the back, one of which is provided with a hook made to latch into a lock provided on the stand. It goes without saying that these projecting-pieces could also be made in combination with the frame of the bicycle and be integral with this. The lock could on the other hand also be fastened to one of these projecting-pieces; in this case the hook is mounted on the stand.

In the accompanying drawing several forms of construction of the new stand are shown.

Figure 1 shows a bicycle in side view with the support according to the present invention in lifted position. Fig. 2 is a rear elevation of the bicycle with the support, when in use. Fig. 3 shows on a larger scale and in side view the arrangement for attaching the stand to the bicycle and the locking-device. Fig. 4 shows in side view another form of construction of these parts and Fig. 5 a third modification of it.

According to the form of construction shown in Figs. 1–3 a projecting or lengthening piece 2 protruding to the back is arranged at either side of the shaft 1 of the hind wheel. The ends of the stand 4, which by way of example may be shaped as a flat iron, bent in U-form, as shown in Fig. 2, are hinged by means of pivots 3 at the horizontal branches of these lengthening pieces 2. In order to hold the lengthening pieces 2 in their position and to prevent a distorting of same, a strut-rod 5 is fixed to the pendent branch of each of the lengthening pieces, the other ends of these strut-rods are fastened to the frame-part 7 by means of a shackle 6 or in similar manner. One of the lengthening pieces 2 has a hook-shaped projection 8, the end of which is placed under the corresponding pivot 3 of the stand 4. To the corresponding arm of the latter a lock 9 is fixed, arranged in such a way, that as soon as the stand is turned down, the hook 8 is forced into the opening of the lock. This lock, as it is constructed, does not constitute in itself a part of the invention; it must, however, be so arranged, that the hook 8, when entering into the lock, is immediately and automatically locked in such a way that the turning up of the stand 4 could only be effected after having opened the lock by means of the suitable key. In Fig. 4 an example of the arrangement of such a lock is shown. In this case the hook 8 is latched behind the hook-shaped end 10 of the spring governed bolt 11, so as to maintain the stand 4 locked in the position it occupies when used, until the bolt 11 is turned back by means of the convenient key. The construction of the support as described above is particularly intended to be used with already existant bicycles and the like as it may at any time be placed and removed again without trouble.

If, in the manufacture of bicycles or similar articles it is required to mount the support directly to the frame, we recommend to select the form of construction shown in Fig. 4, in which the lengthening pieces $2^1$, at which the stand 4 is hinged, and the pawl $8^1$ are integral with the frame of the bicycle or the like.

As shown in Fig. 5 the lock could on the other hand be fastened to the lengthening piece $2^2$ and the hook $8^2$ to the one branch of the stand. The effect would remain the same.

As already mentioned the essential feature of our invention lies in the combination of a double-sided stand with an automatically acting locking device in such a manner, that by turning down the stand the bicycle or the like may by only one manipulation be fixed in position and at the same time secured in such a way, that a misappropriation of it or its use by strangers respectively are prevented at all.

When not in use, the stand may be held tight by means of a spring-cramp 13 or similar contrivance fixed to the back frame-strut (Fig. 1).

What we claim as our invention and desire to secure by Letters Patent is:—

1. In combination with a bicycle, two lengthening pieces attached to the frame of the latter at each side of the hind wheel and projecting to the back, a double sided stand turnably fixed to said lengthening pieces, a lock rigidly fixed to one of said parts, and a hook-shaped projection on the other of said parts and coöperating with the said lock, the latter adapted for automatically and immediately locking the said stand, when turned down, substantially as set forth.

2. In combination with a bicycle, two lengthening pieces attached to the frame of the latter at each side of the hind wheel and projecting to the back, strut-rods fixed with their one ends to the said lengthening pieces and having their other ends fixed to the frame of the bicycle or the like, a double-sided stand turnably fixed to the said lengthening pieces, a lock rigidly fixed to the said stand, and a hook-shaped projection on one of the said lengthening pieces and adapted to coöperate with the said lock, the latter adapted for automatically and immediately locking the said stand, when turned down, substantially as set forth.

In testimony whereof we have hereunto signed our names this 18th day of July 1908, in the presence of two subscribing witnesses.

KARL DUVE.
FRANZ DUVE.

Witnesses:
A. HERMOEYNE DE LA FAYETTE,
EDMUND HUPPERY.